Patented Jan. 12, 1932

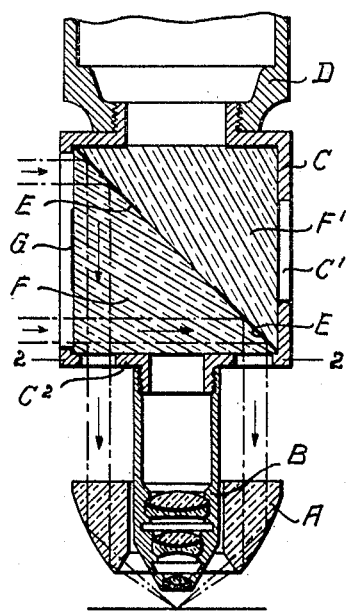
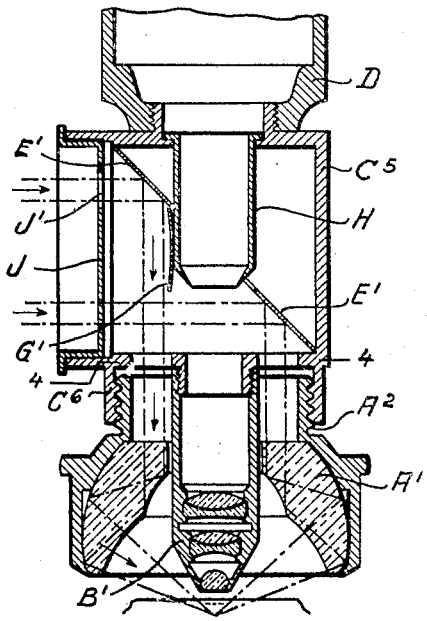
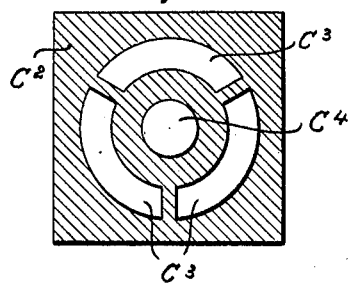
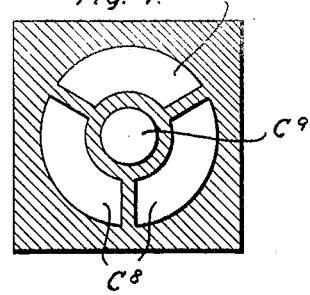

1,840,448

UNITED STATES PATENT OFFICE

HERMANN HEINE, OF WETZLAR, GERMANY, ASSIGNOR TO THE FIRM ERNST LEITZ, OPTISCHE WERKE, OF WETZLAR, GERMANY

ILLUMINATING DEVICE FOR MICROSCOPES

Application filed January 25, 1930, Serial No. 423,533, and in Germany January 31, 1929.

This invention relates to an improved illuminating device for microscopes.

For many purposes it is necessary to illuminate objects under microscopic examination by incident light, i. e. by light rays directed on to the object from above. Many devices have been used for this purpose among which may be mentioned the Lieberkühn reflector and various so-called "vertical illuminators" in which the illuminating rays are passed by a reflector down through the optical system of the objective itself. These have certain disadvantages, the Lieberkühn reflector necessitating the transmission of light from below the object which had to be backed by an opaque ground or stop and the vertical illuminators requiring somewhat particular adjustment of the light and being liable to cause some confusion between the illuminating rays and those forming the image.

The device according to the present invention is free from such disadvantages and affords a very efficient means for the examination of objects by incident light.

The improved illuminating device comprises a condenser surrounding the objective and a prism or other reflecting element above or behind the objective and the condenser, the arrangement being such that light is reflected through the condenser and thereby is caused to converge on to the object, the path of such illuminating light rays before they enter the condenser being external to the image-forming optical system. The condenser itself may be of known type such as is used, in quite a different way, for dark field illumination.

Preferably the condenser is mounted to surround the objective that it is adjustable coaxially therewith so that its focal point need not always coincide with that of the objective but may, for instance, be lower. This is advantageous, for example, in examining more or less transparent objects or objects rendered so by immersion in oil or other fluid, as the object can then be illuminated by diffused light.

In the accompanying drawings which are diagrammatic,

Figure 1 is a central vertical section through one form of illuminating device according to this invention, Figure 2 is a sectional plan on the line 2—2 of Figure 1, Figure 3 is a view similar to Figure 1 but showing a modified construction of illuminating device also according to this invention, and Figure 4 is a sectional plan on the line 4—4 of Figure 3.

Referring now to Figures 1 and 2, A is a condenser mounted so as to surround an objective B suspended from the bottom plate of a box or casing C attached to the lower end D of the body tube of a microscope. The casing C contains a reflecting surface E with a central space, this surface being disposed between the cemented surface of two glass prisms F and $F^1$. The lefthand side of the casing C in Figure 1 is open to admit light from an outside source to the reflecting surface E, the central rays being blocked by a screen G. At the righthand side of the casing C is an opening $C^1$ through which any subsidiary light can pass out.

The path of the illuminating rays is indicated by the arrows. The rays are reflected downwards as a column of light surrounding the objective B and into the condenser A and are caused by said condenser to converge on to the object under examination. In this construction the condenser is intended to be fixed in any convenient way relatively to the objective, the focal point of the condenser preferably coinciding with that of the objective.

As will be seen from Figure 2, the bottom plate $C^2$ of the casing C has segmental openings $C^3$ through which the illuminating rays pass. The image-forming rays from the objective B pass up through the central aperture $C^4$ and through the clear space in the reflecting surface E entirely free from interference by the illuminating rays.

The construction illustrated in Figures 3 and 4, while following the same principles, differs in some of its details from the construction illustrated in Figures 1 and 2. The prisms are dispensed with and the reflector $E^1$ supported in the casing $C^5$ has passing down through its central space a screening tube H fixed in the casing. At the lefthand side of the casing $C^5$ is fitted a detachable and rotatable azimuth screen J having an aperture $J^1$. There is also fixed within the casing $C^5$ a screen $C^1$ serving to block out the central rays from the outside source of light when the screen J is not in use.

In this construction the condenser $A^1$ is carried in a screwthreaded mounting $A^2$ engaging with a similarly screwthreaded sleeve $C^6$ at the bottom of the casing $C^5$. Thus, by rotating the condenser it can be raised or lowered relatively to the objective $B^1$ which it surrounds. By this means the focal point of the condenser can be brought below that of the objective $B^1$ somewhat as indicated in Figure 3, this affording an illumination of the object by diffused light, which is very desirable in some cases.

As in the construction previously described with reference to Figures 1 and 2, the path of the illuminating rays is exterior to that of the image-forming rays from the objective, and there is thus no risk of confusion or interference between those two sets of rays.

Figure 4 shows the segmental openings $C^8$ in the bottom plate of the casing $C^5$ through which openings the illuminating rays can pass to the condenser whilst the image-forming rays pass up through the central aperture $C^9$.

I claim:—

1. In an illuminating device for microscopes, a casing, an objective suspended from said casing and a condenser surrounding said objective, attached to the lower end of a microscope, a bottom plate for said casing having segmental openings through which the illuminating rays pass, and a central opening allowing the passage of the image-forming rays from said objective without interference by the illuminating rays.

2. In an illuminating device for microscopes, a casing, a reflector having a central space and supported in said casing, a screening tube passing down through the space in said reflector, a detachable and rotatable azimuth screen on one side of the casing and having an aperture, a screen within said casing for blocking out the outside central rays, when said azimuth screen is not used, a threaded sleeve at the bottom of the casing, a condenser, and an objective surrounded by said condenser, a threaded sleeve for said condenser engaging said casing sleeve to allow rotation of said condenser to raise and lower the same relatively to the objective to bring the focal point of the condenser below that of the objective affording an illumination of the object to be examined by different light.

3. In an illuminating device for microscopes, a casing, an objective suspended from said casing, and a condenser surrounding said objective, a bottom plate for said casing, having segmental openings to allow the illuminating rays to pass to the condenser, and a central aperture in said bottom plate to allow the upward passage of the image-forming rays.

Signed at Frankfort-on-the-Main, Germany, this 10th day of January, A. D. 1930.

HERMANN HEINE.